United States Patent
Liu (10) Patent No.: US 8,234,758 B2
(45) Date of Patent: Aug. 7, 2012

(54) SHOULDER STRAP ASSEMBLY AND SNAP HOOK STRUCTURE THEREOF

(75) Inventor: Ko-Tay Liu, Chung-Ho (TW)

(73) Assignee: Sinox Co., Ltd., Chunhg-Ho, Taipei County (TW)

( * ) Notice: Subject to any disclaimer, the term of this patent is extended or adjusted under 35 U.S.C. 154(b) by 465 days.

(21) Appl. No.: 12/327,609

(22) Filed: Dec. 3, 2008

(65) Prior Publication Data

US 2009/0193631 A1    Aug. 6, 2009

(30) Foreign Application Priority Data

Feb. 4, 2008   (CN) ..................... 2008 2 0004166 U (51) Int. Cl.
    *A44B 99/00*     (2010.01)
    *A44B 13/00*     (2006.01)
(52) U.S. Cl. ................ 24/265 H; 24/582.11; 24/599.9; 24/599.5; 70/18; 70/28; 70/312
(58) Field of Classification Search ............... 24/265 H, 24/578.14, 582.1, 582.11, 600.9, 601.1, 599.9, 24/599.5, 578.12, 300; 70/18, 22, 28, 312, 70/29, 44, 47, 58, 68
    See application file for complete search history.

(56) References Cited

U.S. PATENT DOCUMENTS

| | | | | |
|---|---|---|---|---|
| 358,813 A * | 3/1887 | Jones | .......................... | 24/599.7 |
| 715,655 A * | 12/1902 | Getz | .......................... | 24/600.2 |
| 1,167,377 A * | 1/1916 | Brown | .............................. | 70/37 |
| 1,362,512 A * | 12/1920 | Schermuly | .................... | 24/599.9 |
| 1,376,278 A * | 4/1921 | Hokanson | .................... | 24/599.3 |
| 4,213,314 A * | 7/1980 | Trader | .............................. | 70/68 |
| 4,792,026 A * | 12/1988 | Dimmick et al. | ............. | 190/101 |
| 5,042,277 A * | 8/1991 | Jenn-Rong | ........................ | 70/28 |
| 5,685,179 A * | 11/1997 | Yang | ................................ | 70/28 |
| 6,082,155 A * | 7/2000 | Su | .................................... | 70/22 |
| 6,227,015 B1* | 5/2001 | Luquire | ........................... | 70/18 |
| 6,244,081 B1* | 6/2001 | Schlipper | ......................... | 70/18 |
| 6,381,997 B1* | 5/2002 | Chen | ................................ | 70/28 |
| 6,931,894 B2* | 8/2005 | Yu | .................................. | 70/18 |
| 7,415,850 B2* | 8/2008 | Smyczek et al. | ................. | 70/51 |
| 7,458,135 B2* | 12/2008 | Mikesell et al. | ............... | 24/300 |
| 2005/0199662 A1* | 9/2005 | Rekuc | ........................... | 224/264 |
| 2007/0056147 A1* | 3/2007 | Tracy | .......................... | 24/265 H |
| 2007/0261213 A1* | 11/2007 | Nolan et al. | .................... | 24/300 |
| 2008/0120818 A1* | 5/2008 | Belcourt et al. | ............. | 24/599.5 |

* cited by examiner

*Primary Examiner* — Robert J Sandy
*Assistant Examiner* — Rowland D Do
(74) *Attorney, Agent, or Firm* — Workman Nydegger (57) ABSTRACT

A shoulder strap assembly and a snap hook structure thereof are presented. A strap of the shoulder strap assembly is combined with a first article through the snap hook structure. The snap hook structure includes a main body and a keeper member. The main body hooks the first article, and the keeper member ensures the main body to keep hooking the first article. The keeper member has a perforation. The user can wind the strap around a second article, and use a lock to pass through the perforation so as to lock the first article with the second article, thereby preventing the first article from being stolen.

17 Claims, 13 Drawing Sheets

SHOULDER STRAP ASSEMBLY AND SNAP HOOK STRUCTURE THEREOF

CROSS-REFERENCE TO RELATED APPLICATIONS

This non-provisional application claims priority under 35 U.S.C. §119(a) on Patent Application No(s). 200820004166.0 filed in China, P.R.C. on Feb. 4, 2008 the entire contents of which are hereby incorporated by reference.

BACKGROUND OF THE INVENTION

1. Field of Invention

The present invention relates to a shoulder strap structure, in particularly, to a locking-type shoulder strap assembly and a snap hook structure thereof.

2. Related Art

Shoulder bags are usually provided with shoulder straps. Two ends of a shoulder strap are connected with two sides of a shoulder bag, which allows the bag hung at a side of a user. The shoulder straps may be combined with the shoulder bags in various manners which may be substantially classified into a detachable type and a fixed type. Most of the fixed shoulder straps are directly tailored to shoulder bags or connected to shoulder bags with closed rings. Although the fixed shoulder straps are firm and durable, the fixed shoulder straps are not convenient to be received or use in some circumstances. A detachable shoulder strap can hook one or two ends of a shoulder bag by the use of a snap hook assembly that may be opened and closed. Therefore, the detachable shoulder straps are convenient to be assembled with the bags in use or detached from the bags when being received, so the detachable shoulder straps are more convenient in use than the fixed shoulder straps.

Inevitably, some costly personal articles are input into the shoulder bags. Users may often leave the shoulder bag in a public place alone for the sake of convenience, and consequently, it is not unusual to see that the shoulder bags under no care are stolen together with the costly personal articles. For example, notebooks become popularized, so more and more bags are designed dedicatedly for the notebooks. Most of the notebook bags are designed to be carried by users both on shoulder and by hand, so detachable shoulder straps must be additionally provided for users to carry the bags on shoulder besides the handles. Notebooks are expensive electronic products. If a notebook is left alone in a public place, the notebook may definitely become a target of a vicious person. Thus, some notebook bags can be locked at zip fasteners, so as to protect the notebooks from being taken out. However, although the bags may protect the notebooks from being stolen out of the bags, vicious persons may take away the bags together with the notebooks. Therefore, it becomes an urgent problem to be solved to efficiently protect the bags and the articles inside from being stolen.

SUMMARY OF THE INVENTION

In view of the above problems, the present invention is mainly directed to a shoulder strap assembly and a snap hook structure thereof, which provides a locking function for the user, so as to solve the problem in the prior art that a bag left alone may be easily stolen.

In order to solve the aforementioned problem, the present invention provides a shoulder strap assembly having a snap hook structure, which is used to lock a first article at a fixed position, so as to provide an anti-theft function to protect the first article from being stolen. The first article may be, but not limited to, a bag. The shoulder strap assembly of the present invention includes a strap and at least one snap hook structure. One end of the strap is directly combined with the first article, and the other end is combined with the first article through the snap hook structure, so as to enable the user to carry the first article on shoulder or by hand. The strap may wind around a second article, so as to cooperate with a block member to lock the first article with the second article. The second article may be, but not limited to, a chair or a desk. The snap hook structure includes a main body and a keeper member. The main body has a body portion and a hook portion extending from the body portion. The hook portion forms a hooking range and hooks the first article. The other end of the body portion is connected to the strap. The keeper member is rotatably disposed on the main body, and has an acting portion corresponding to the body portion and a clamping portion enclosing the hooking range. The keeper member is pressed to rotate, so as to drive the clamping portion to open the hooking range. The acting portion has a stop portion, which is, but not limited to, a perforation. A hook of a lock is put into the perforation of the acting portion and is locked, so as to limit the rotation of the keeper member and enable the clamping portion to keep enclosing the hooking range, thereby locking the first article with the second article.

In another embodiment of the present invention, the two ends of the strap are both combined with the first article through the snap hook structure. In this manner, the user may detach one snap hook structure from the first article, and put the hook portion of the detached snap hook structure into the perforation of the undetached snap hook structure, such that the undetached snap hook structure cannot be separated from the first article. Then, the user puts the hook of the lock into the perforation of the detached snap hook structure, thereby locking the first article with the second article.

In a preferred embodiment of the present invention, one end of the strap is combined with the first article through the snap hook structure, and the other end is combined with the first article through a lock snap-hook structure. The lock snap-hook structure includes a lock main body, a lock keeper member, and a lock head. The lock main body has a lock body and a lock hook extending from the lock body. The lock hook forms a lock hooking range at one end of the lock body, and the other end of the lock body is connected with the other end of the strap. The lock hook selectively hooks the first article, so as to connect the strap and the first article, or is put into the perforation to limit the rotation of the keeper member and enable the clamping portion to keep enclosing the hooking range. The lock keeper member may be rotatably disposed on the lock main body. The lock keeper member has a lock acting portion corresponding to the lock body and a lock clamping portion for enclosing the lock hooking range. The lock keeper member is pressed to rotate, so as to drive the lock clamping portion to open the lock hooking range. The lock head is disposed on the lock body, and has a retractable stopper. The stopper protrudes from the lock head in a locking mode, so as to block the lock keeper member to limit the rotation of the lock clamping portion and enable the lock clamping portion to keep enclosing the lock hooking range, thereby locking the first article with the second article. Therefore, as long as the user locks the lock head, the first article may be locked with the second article.

The present invention has the following effects. The hook portion of the lock or the lock snap-hook structure as long as being put into the stop portion of the snap hook structure prevents the snap hook structure from separating from the first article (e.g. a bag). Meanwhile, the strap winds around the second article (e.g. a desk) to lock the first article with the second article, thereby providing an effective anti-theft mechanism to protect the first article under no care from being stolen.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the objectives, structures, features, and functions of the present invention more comprehensible, the present invention will be described in detail hereinafter. The snap hook structure and shoulder strap assembly thereof using the same provided by the present invention are applicable, but not limited to, articles to be carried by the user on shoulder or by hand, such as bags, storage boxes, storage bags, storage cases, and electronic devices. In the following detailed description of the present invention, the shoulder strap assembly and the snap hook structure applied in a bag will be described as preferred embodiments of the present invention.

Figure 1:
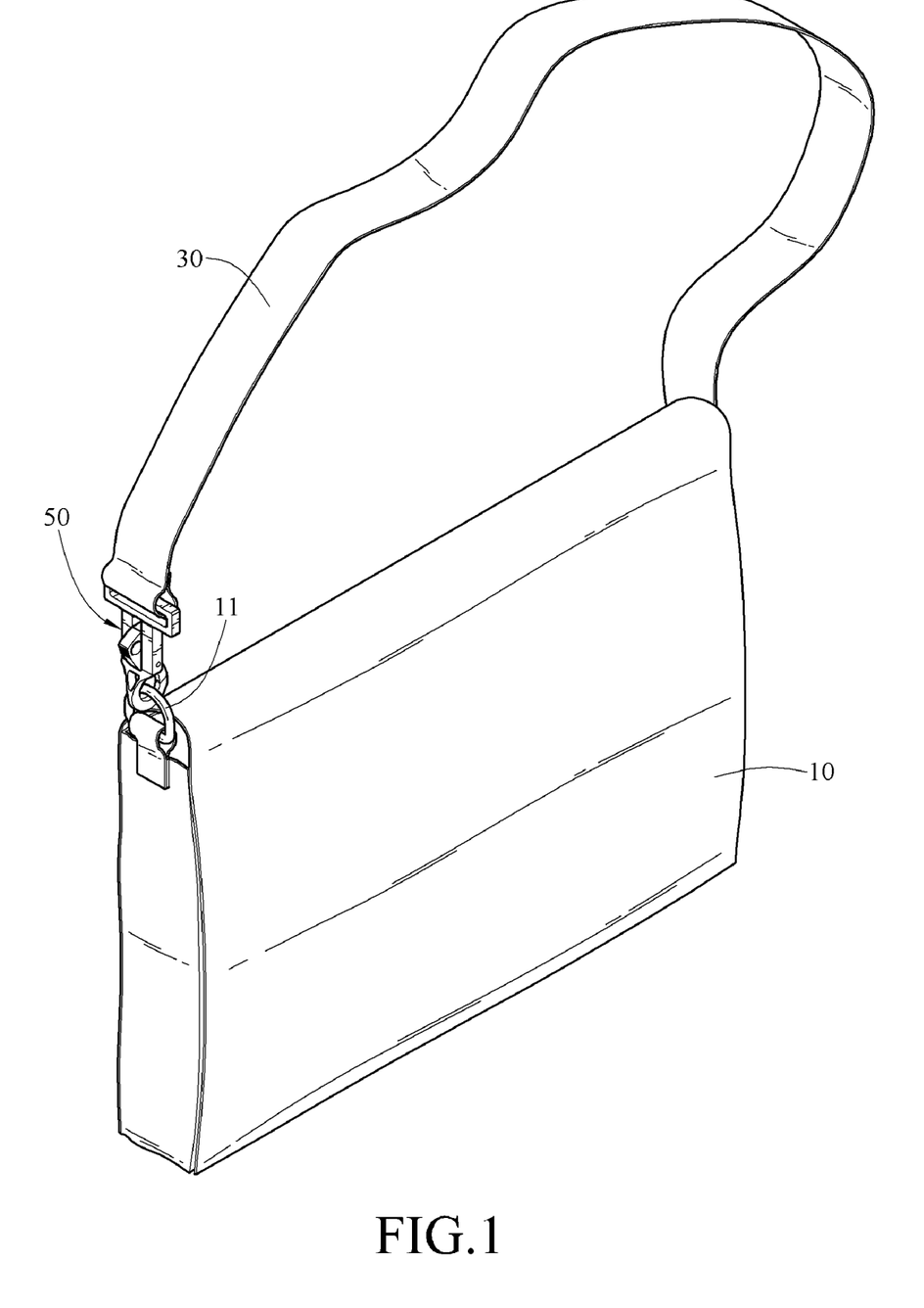
FIG. 1 is a schematic three-dimensional view of a shoulder strap assembly combined with the first article according to a first embodiment of the present invention.
Figure 2:
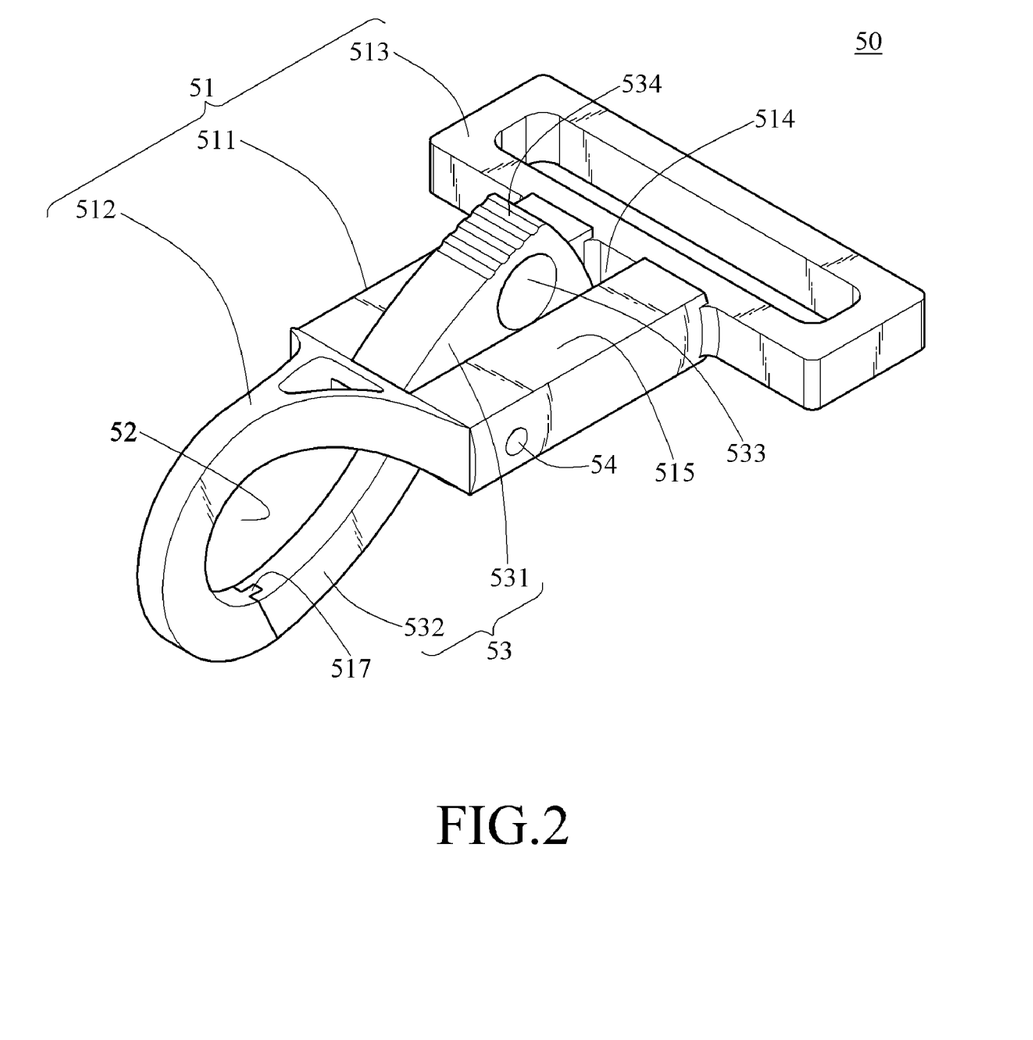
FIG. 2 is a schematic three-dimensional view of a snap hook structure according to the first embodiment of the present invention, in which a clamping portion of the keeper member encloses a hooking range.

Referring to FIG. 1 and FIG. 2, the shoulder strap assembly having a snap hook structure and the snap hook structure according to the first embodiment of the present invention are shown, respectively. The shoulder strap assembly having a snap hook structure provided by the present invention may be used to fix a first article 10 at a fixed position (e.g. a desk or a chair), so as to provide an anti-theft function to protect the first article 10 from being stolen. The first article 10 may be, but not limited to, a bag, such as a notebook bag, a briefcase, and a camera bag. The shoulder strap assembly having a snap hook structure in this embodiment includes a strap 30 and a snap hook structure 50. The first article 10 has a ring 11 which may be caught by the snap hook structure 50.

Figure 5:
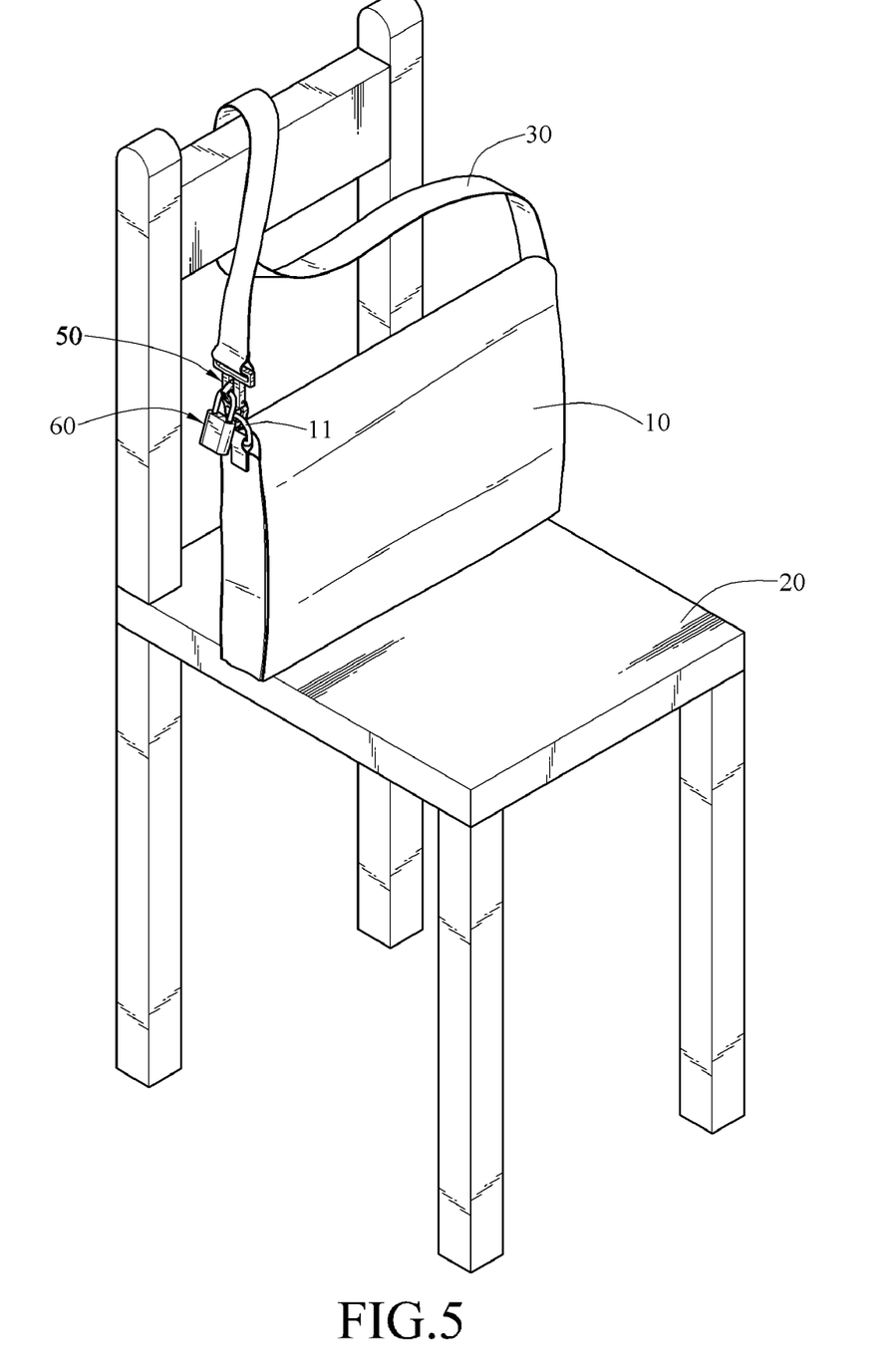
FIG. 5 is a schematic three-dimensional view of the shoulder strap assembly locking the first article with the second article according to the first embodiment of the present invention.
Figure 6:
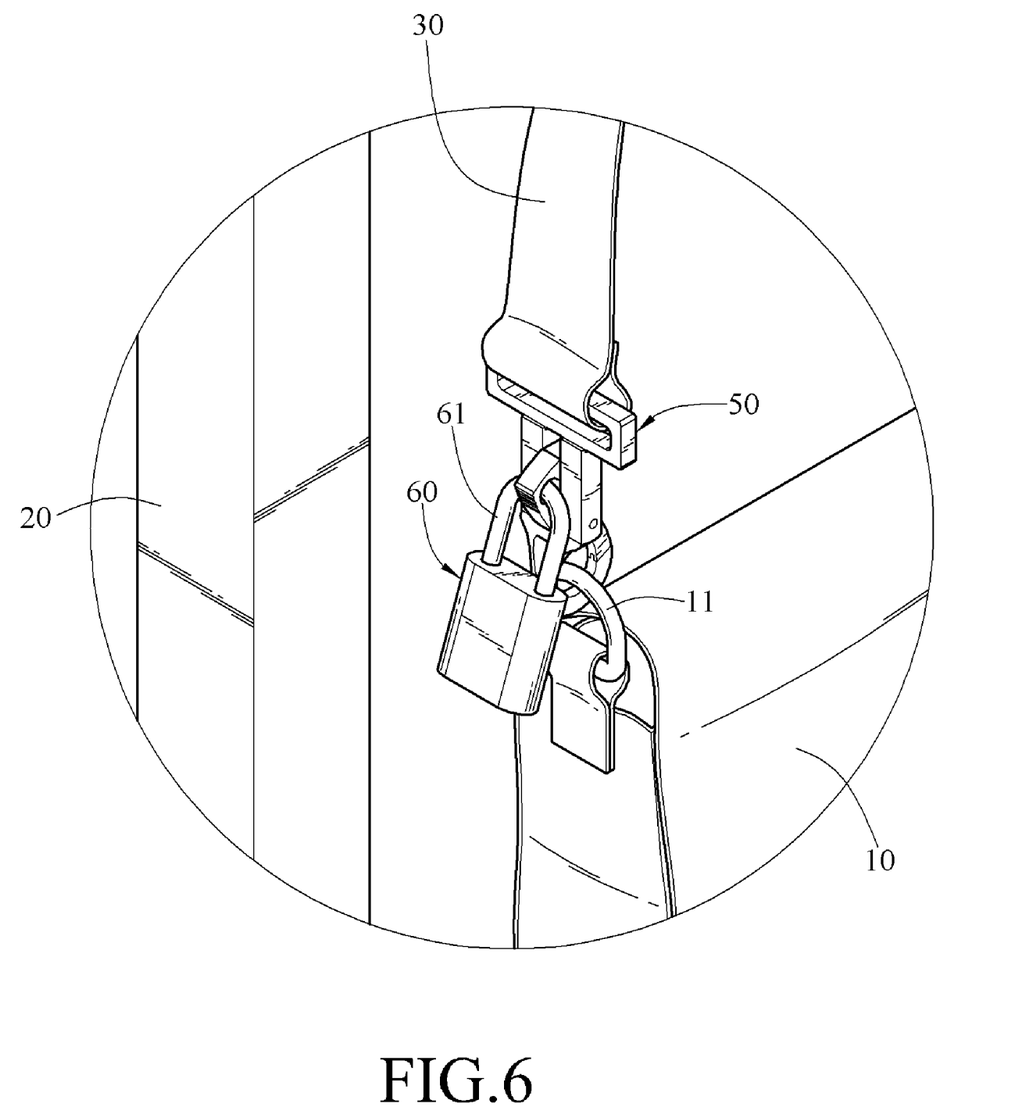
FIG. 6 is a partial schematic three-dimensional view of FIG. 5.

Referring to FIGS. 1, 5, and 6, one end of the strap 30 is directly combined with the first article 10, and the other end of the strap 30 is combined with the first article 10 through the snap hook structure 50, so as to enable the user to carry the first article 10 on shoulder or by hand. The strap 30 may wind around a second article 20, so as to cooperate with a block member to lock the first article 10 with the second article 20. The second article 20 may be, but not limited to, a chair or a desk. In this embodiment, the block member is actually a lock 60 having a hook 61. The lock 60 hooks an article by the hook 61 and locks this article. The lock 60 may be equipped with a password lock head or key lock head.

Referring to FIGS. 1, 2, 3, and 4, the snap hook structure 50 includes a main body 51, a keeper member 53, an axle 54, and an elastic member 55. The main body 51 has a body portion 511, a hook portion 512 extending from the body portion 511, and a ring portion 513. The keeper member 53 has an acting portion 531 corresponding to the body portion 511 and a clamping portion 532.

The hook portion 512 forms a hooking range 52 at one end of the body portion 511 and hooks the ring 11 of the first article 10. The other end of the body portion 511 opposite to the hook portion 512 is connected with the strap 30, i.e., the strap 30 passes through and is connected with the ring portion 513 of the main body 51, so as to combine the strap 30 and the snap hook structure 50. In this manner, the other end of the strap 30 may be combined with the first article 10 through the snap hook structure 50. The body portion 511 has a limiting plane 515 corresponding to the acting portion 531 and a slot 514 penetrating the two sides of the body portion 511. An end edge of the hook portion 512 has an abutted surface 516 which is inclined on the body portion 511. The abutted surface 516 has a rib 517 facing the body portion 511.

Figure 3:
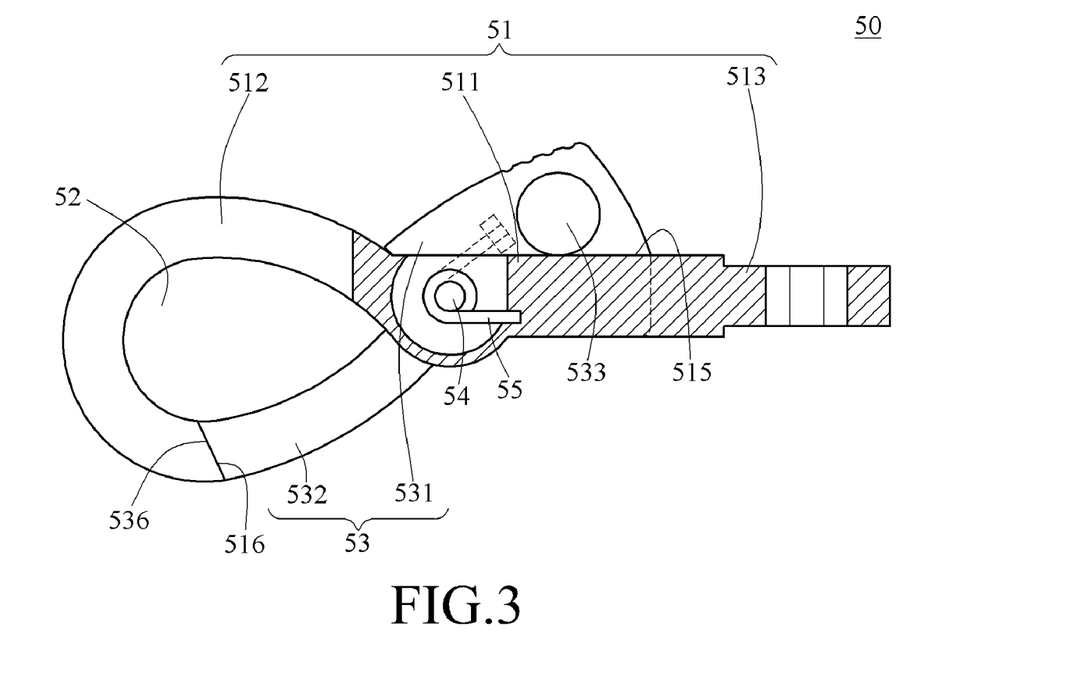
FIG. 3 is a schematic cross-sectional view of the snap hook structure according to the first embodiment of the present invention.
Figure 4:
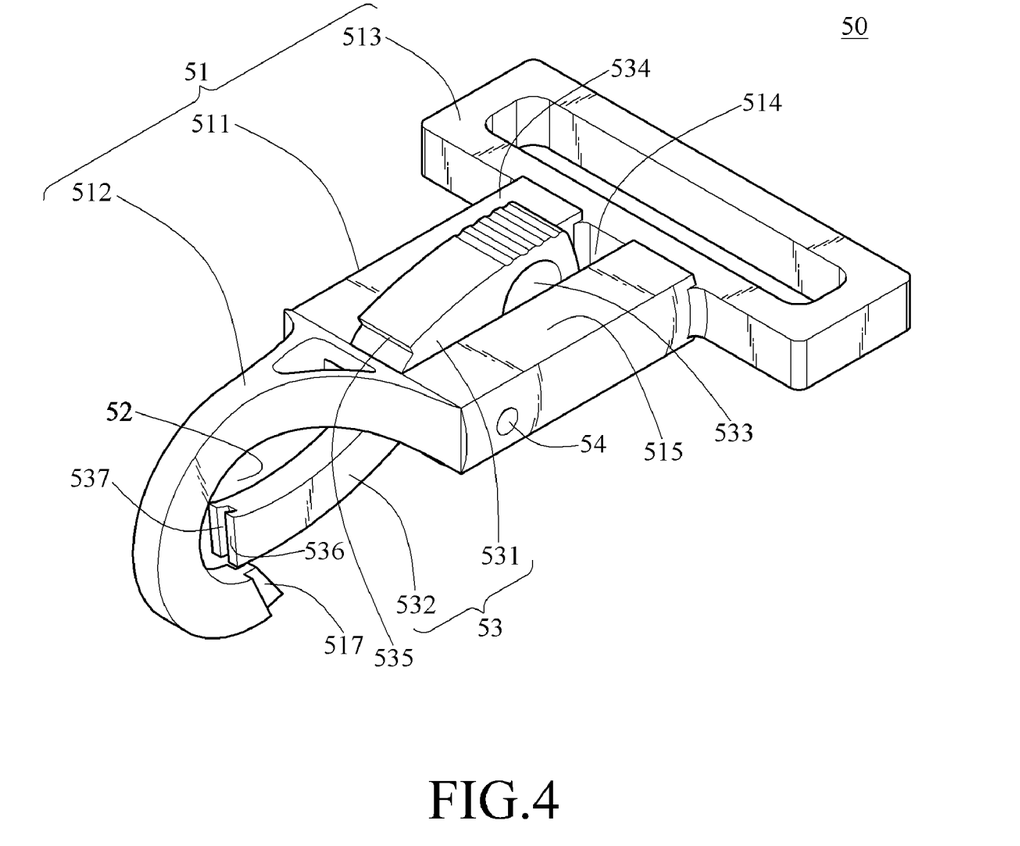
FIG. 4 is a schematic three-dimensional view of the snap hook structure according to the first embodiment of the present invention, in which the clamping portion of the keeper member opens the hooking range.

The keeper member 53 is rotatably disposed on the main body 51. The middle section of the keeper member 53 is pivoted in the slot 514 through the axle 54. Therefore, the keeper member 53 is pressed to rotate with respect to the main body 51, and a portion of the acting portion 531 extends into the slot 514. The acting portion 531 has a stop portion 533, and an end edge of the acting portion 531 has a plurality of grooves 534 and a limiting flange 535. The acting portion 531 is pressed to drive the clamping portion 532 to rotate. The groove 534 is depressed inwards from the end edge of the acting portion 531, so as to increase a frictional force when a finger of the user contact the acting portion 531, for providing the convenience for the user to press the acting portion 531.

The limiting flange 535 abuts against the hook portion 512, so as to prevent the clamping portion 532 from exiting from the hooking range 52.

The clamping portion 532 is used to enclose a hooking range 52 at a locking position, as shown in FIG. 2. When the keeper member 53 is pressed to rotate, the clamping portion 532 will open the hooking range 52 (as shown in FIG. 4). The stop portion 533 may be, but not limited to, a perforation, which penetrates the two sides of the acting portion 531. The end edge of the clamping portion 532 has an abut surface 536 which abuts against the abutted surface 516 of the hook portion 512 at the locking position. The abut surface 536 has a rabbet 537. The rib 517 of the abutted surface 516 is embedded into the rabbet 537 when the abut surface 536 urges against the abutted surface 516, so as to increase the lateral external force that may be endured by the clamping portion 532 when the keeper member 53 encloses the hooking range 52, so as to prevent the clamping portion 532 from disengaging from the hook portion 512 and protect the keeper member 53 from being damaged. In addition, the arrangement positions of the rabbet 537 and rib 517 may be exchanged, i.e., the rabbet 537 is disposed in the abutted surface 516, while the rib 517 is disposed on the abut surface 536, which can achieve the same anticipated effect.

The elastic member 55 may be, but not limited to, a torsion spring, which is disposed in the main body 51 and corresponding to the keeper member 53. The middle section of the elastic member 55 is fitted on the axle 54, and the two ends of the elastic member 55 abut against the body portion 511 of the main body 51 and the acting portion 531 of the keeper member 53. Therefore, the elastic member 55 pushes the keeper member 53 in a direction of enclosing the hooking range 52, such that the clamping portion 532 normally encloses the hooking range 52 at the locking position.

As shown in FIGS. 1, 5, and 6, when the clamping portion 532 of the keeper member 53 is at the locking position, the hook 61 can urge against the limiting plane 515 of the main body 51 when the user puts the hook 61 (the block member) of the lock 60 into the stop portion 533 (the perforation) of the acting portion 531, so that the keeper member 53 cannot be pressed to rotate. In this manner, the keeper member 53 is locked by the lock 60 and cannot rotate, and the clamping portion 532 is made to keep enclosing the hooking range 52, such that the hook portion 512 of the main body 51 cannot be separated from the ring 11 of the first article 10. Further, since the strap 30 winds around the second article 20, the shoulder strap assembly of the present invention may lock the first article 10 with the second article 20, so as to prevent the two from separating from each other, thereby providing the anti-theft function.

Figure 7:
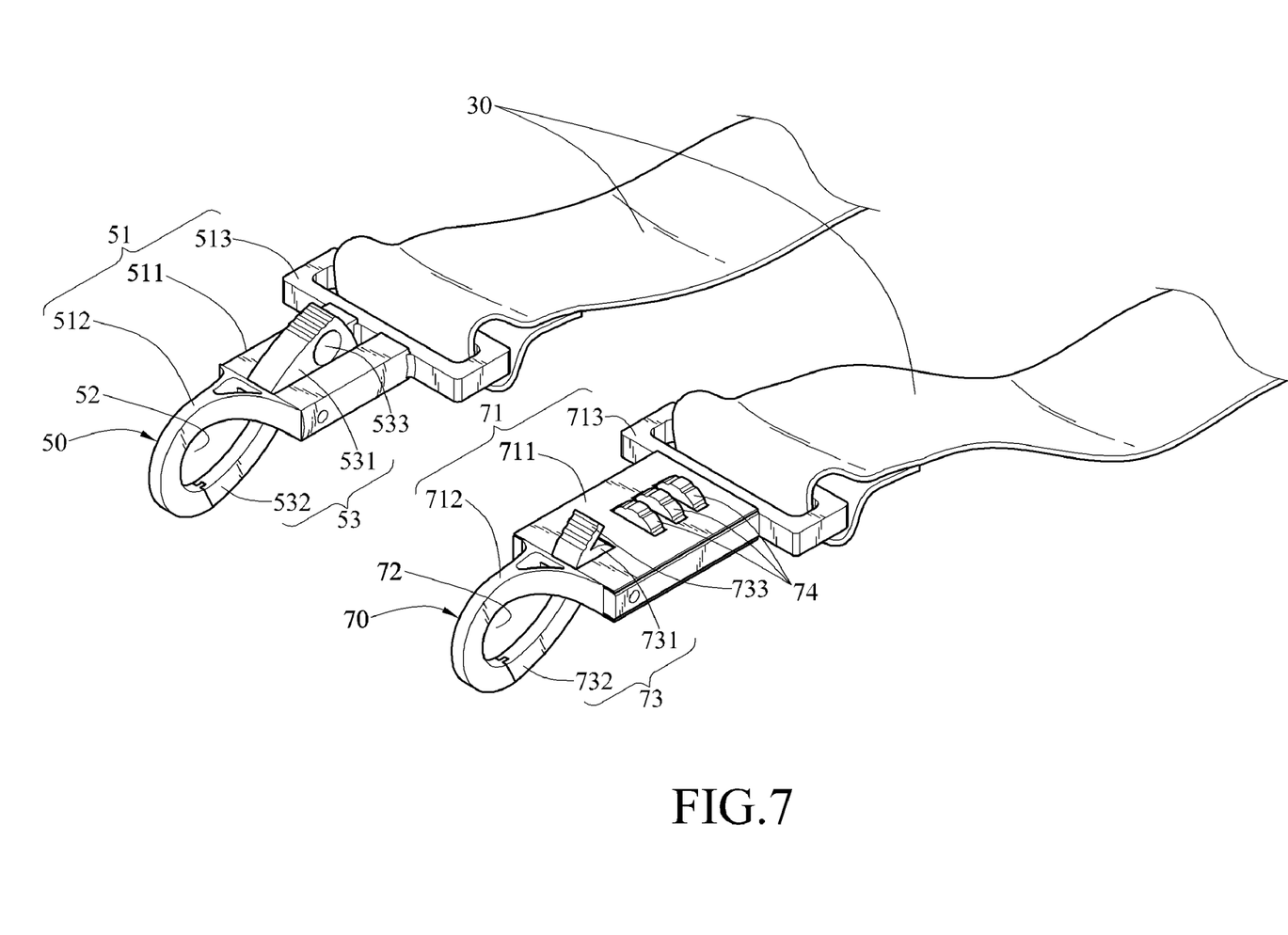
FIG. 7 is a schematic three-dimensional view of a shoulder strap assembly according to a second embodiment of the present invention.
Figure 8:
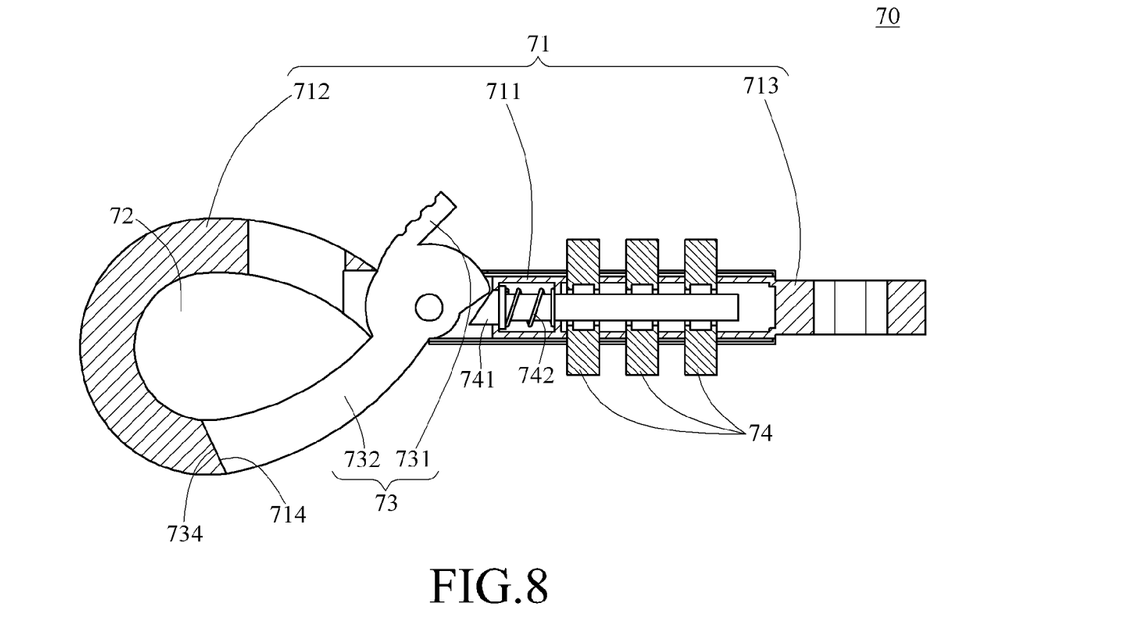
FIG. 8 is a schematic cross-sectional view of a lock snap-hook structure according to the second embodiment of the present invention, in which a lock clamping portion of a lock keeper member encloses a lock hooking range.
Figure 9:
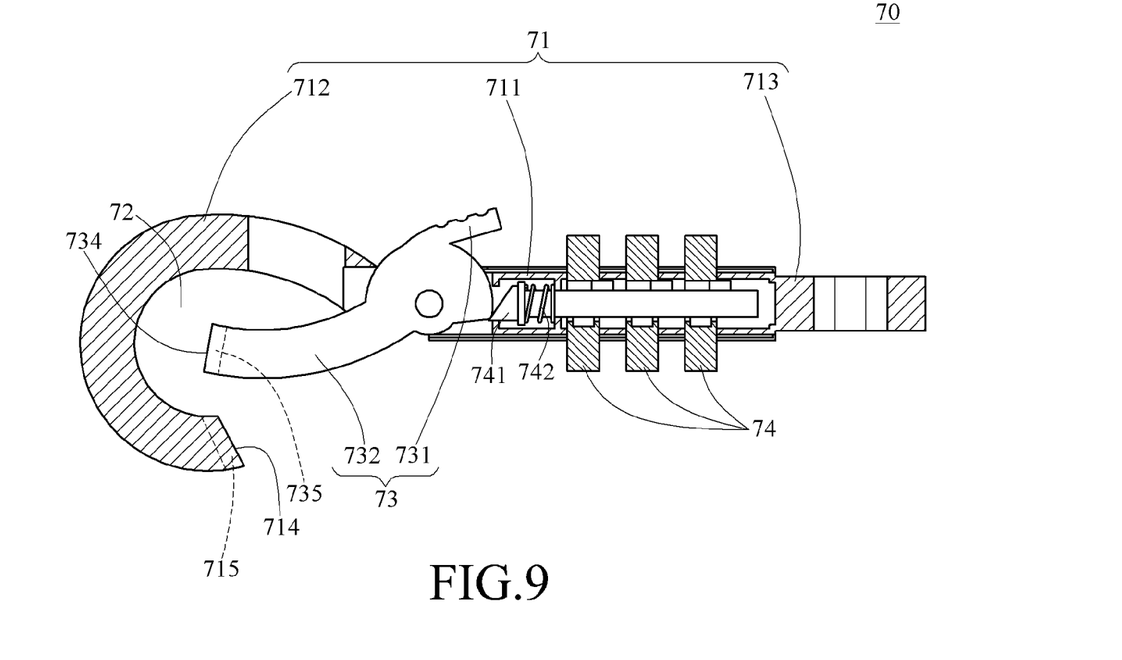
FIG. 9 is a schematic cross-sectional view of the lock snap-hook structure according to the second embodiment of the present invention, in which the lock clamping portion of the lock keeper member opens the lock hooking range.
Figure 10:
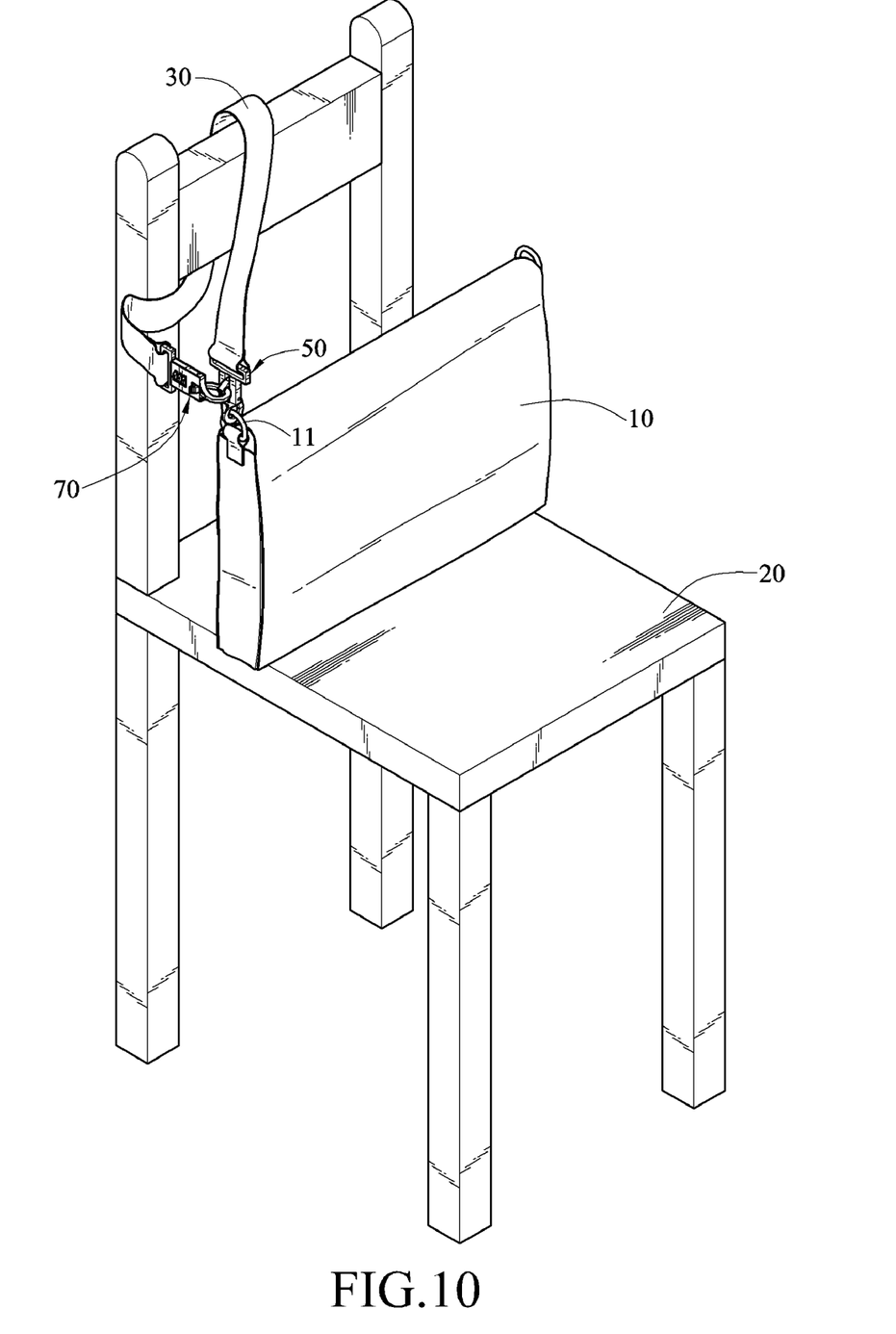
FIG. 10 is a schematic three-dimensional view of the shoulder strap assembly locking the first article with the second article according to the second embodiment of the present invention.
Figure 11:
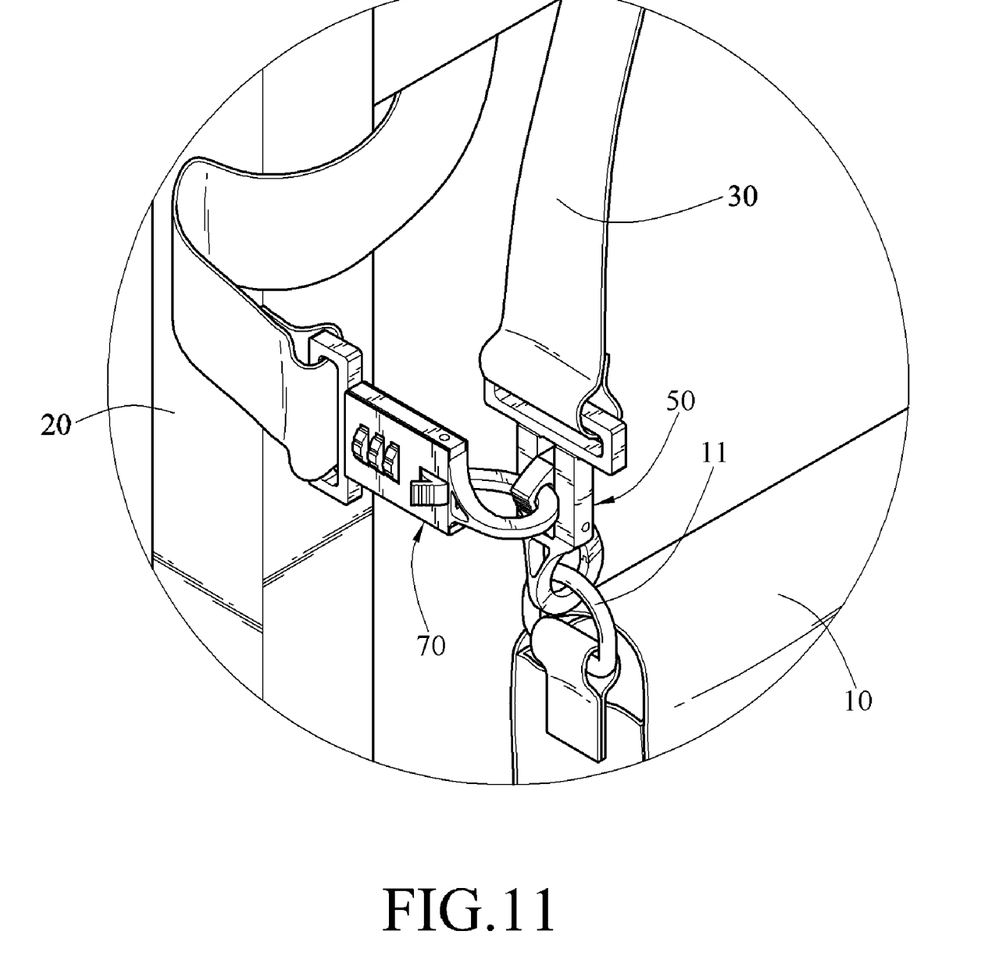
FIG. 11 is a partial schematic three-dimensional view of FIG. 10.

As shown in FIGS. 7, 8, and 9, the shoulder strap assembly having a snap hook structure and the snap hook structure thereof provided in the second embodiment of the present invention are shown. In this embodiment, one end of the strap 30 is combined with the first article 10 through the snap hook structure 50, and the other end of the strap 30 is combined with the first article 10 through a lock snap-hook structure 70. In this embodiment, the detailed structure and implementation aspect of the snap hook structure 50 are the same as those of the first embodiment, and will not be repeated herein. This embodiment is different from the first embodiment mainly in terms that the user can use the lock snap-hook structure 70 of the shoulder strap assembly to lock the first article 10.

As shown in FIGS. 7 to 9 and FIGS. 10 to 11, the lock snap-hook structure 70 includes a lock main body 71, a lock keeper member 73, a lock head 74, and an elastic member 742. The lock main body 71 has a lock body 711, a lock hook 712 extending from the lock body 711, and a locking ring portion 713. The lock hook 712 forms a lock hooking range 72 at one end of the lock body 711, and the other end of the lock body 711 is connected with the strap 30, i.e., one end of the strap 30 is fitted on the ring portion 513 of the snap hook structure 50, and the other end of the strap 30 is fitted on the locking ring portion 713 of the lock snap-hook structure 70. The lock hook 712 selectively hooks the ring 11 of the first article 10 to connect the strap 30 and the first article 10, or is put into the perforation (i.e., the stop portion 533) of the snap hook structure 50 to limit the rotation of the keeper member 53 and enable the clamping portion 532 to keep enclosing the lock hooking range 72. Therefore, the snap hook structure 50 cannot be separated from the first article 10.

The lock keeper member 73 is rotatably disposed on the lock main body 71. The lock keeper member 73 has a lock acting portion 731 corresponding to the lock body 711 and a lock clamping portion 732 enclosing the lock hooking range 72. The lock keeper member 73 rotates when the lock acting portion 731 is pressed, so that the lock clamping portion 732 opens the lock hooking range 72. The lock head 74 is disposed on the lock body 711, and has a retractable stopper 741. The lock head 74 may be a password lock head or a key lock head, and may be adjusted by a user between a locking mode and an unlocking mode. In this embodiment, the lock head 74 is a password lock head. The elastic member 742 may be, but not limited to, a compression spring, which is fitted on the stopper 741. The elastic member 742 pushes against the stopper 741 to abut against the end edge of the lock acting portion 731 of the lock keeper member 73, so as to enable the lock clamping portion 732 to normally enclose the lock hooking range 72. The end edge of the lock acting portion 731 has a plurality of grooves 733, and the grooves 733 are depressed inwards from the end edge of the lock acting portion 731, so as to increase the friction force when a finger of the user contacts the lock acting portion 731, for providing the convenience for the user to press the lock acting portion 731.

The end edge of the lock hook 712 has an abutted surface 714 which is inclined on the lock body 711. The abutted surface 714 has a rib 715 facing the lock body 711. The end edge of the lock clamping portion 732 has an abut surface 734 which abuts against the abutted surface 714 of the lock hook 712 at a locking position. The abut surface 734 has a rabbet 735, and the rib 715 of the abutted surface 714 is embedded into the rabbet 735 when the abut surface 734 urges against the abutted surface 714, so as to increase the lateral external force which may be endured by the lock clamping portion 732 when the lock keeper member 73 encloses the lock hooking range 72, so as to prevent the lock clamping portion 732 from disengaging from the lock hook 712 and protecting the lock keeper member 73 from being damaged. In addition, the arrangement positions of the rabbet 735 and rib 715 may be exchanged, i.e., the rabbet 735 is disposed in the abutted surface 714, while the rib 715 is disposed on the abut surface 734, which achieves the same anticipated effect.

When the lock head 74 is in a locking mode, the stopper 741 may displace with respect to the lock main body 71, so the user may press the lock acting portion 731 to enable the lock clamping portion 732 to open the lock hooking range 72, i.e., rotate the lock acting portion 731 to push the stopper 741 of the lock head 74 away. When the lock head 74 is in a locking mode, the stopper 741 cannot displace with respect to the lock main body 71, so the user cannot press the lock acting portion 731 to rotate the lock keeper member 73, so as to enable the lock clamping portion 732 to keep enclosing the lock hooking range 72, i.e., the lock acting portion 731 is locked by the stopper 741 of the lock head 74 and cannot be rotated. In other words, the stopper 741 protrudes from the lock head 74 in the locking mode, so as to make the stopper 741 to block the lock keeper member to limit the rotation of the lock clamping portion 732, and make the lock clamping portion 732 keep enclosing the lock hooking range 72. Therefore, the lock snap-hook structure 70 is first detached and the strap 30 winds around the second article 20, and then the lock hook 712 of the lock snap-hook structure 70 is put into the perforation (i.e., the stop portion 533) of the snap hook structure 50, and then the lock head 74 is locked, thereby locking the first article 10 with the second article 20.

Figure 12:
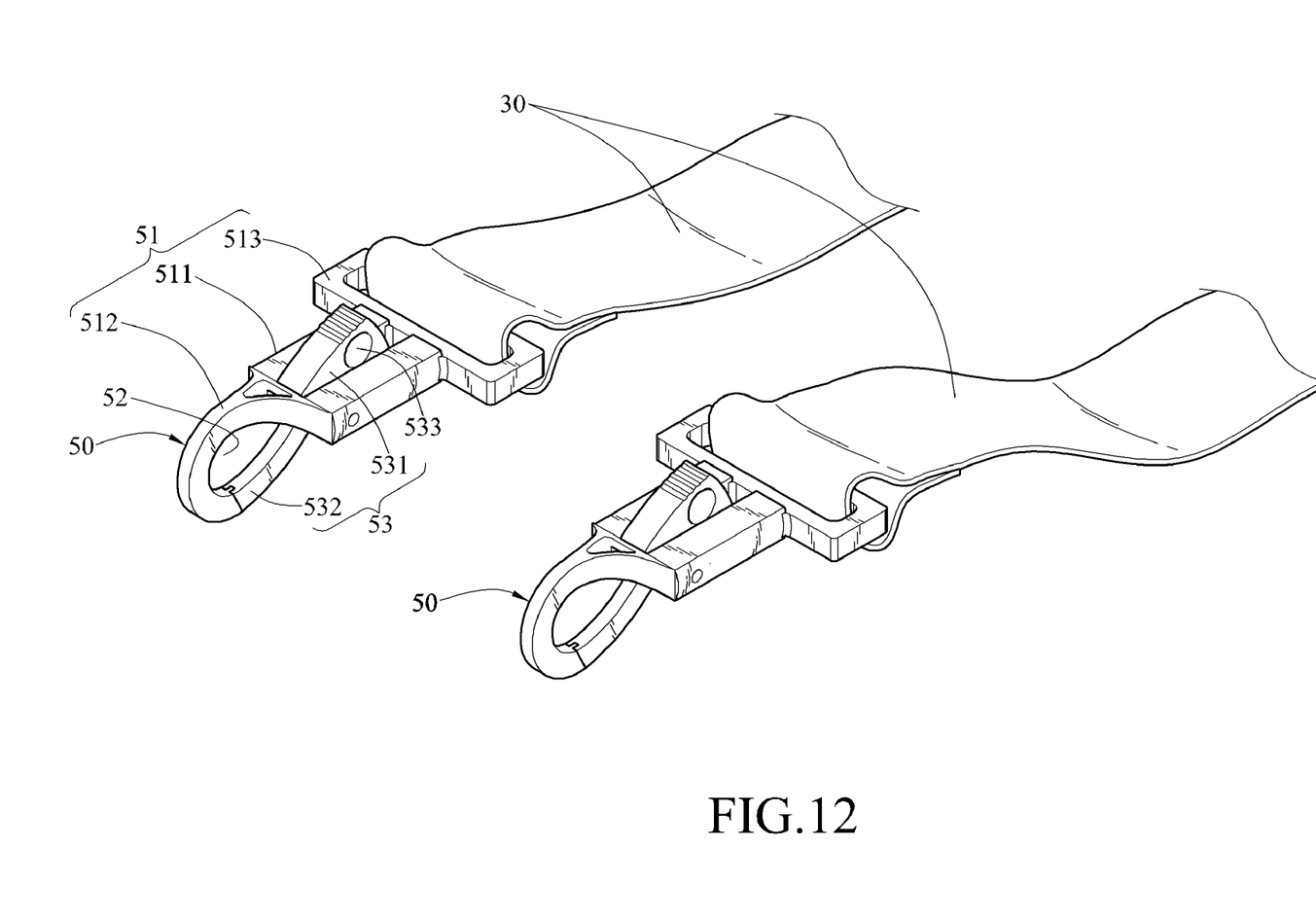
FIG. 12 is a schematic three-dimensional view of a shoulder strap assembly according to a third embodiment of the present invention.
Figure 13:
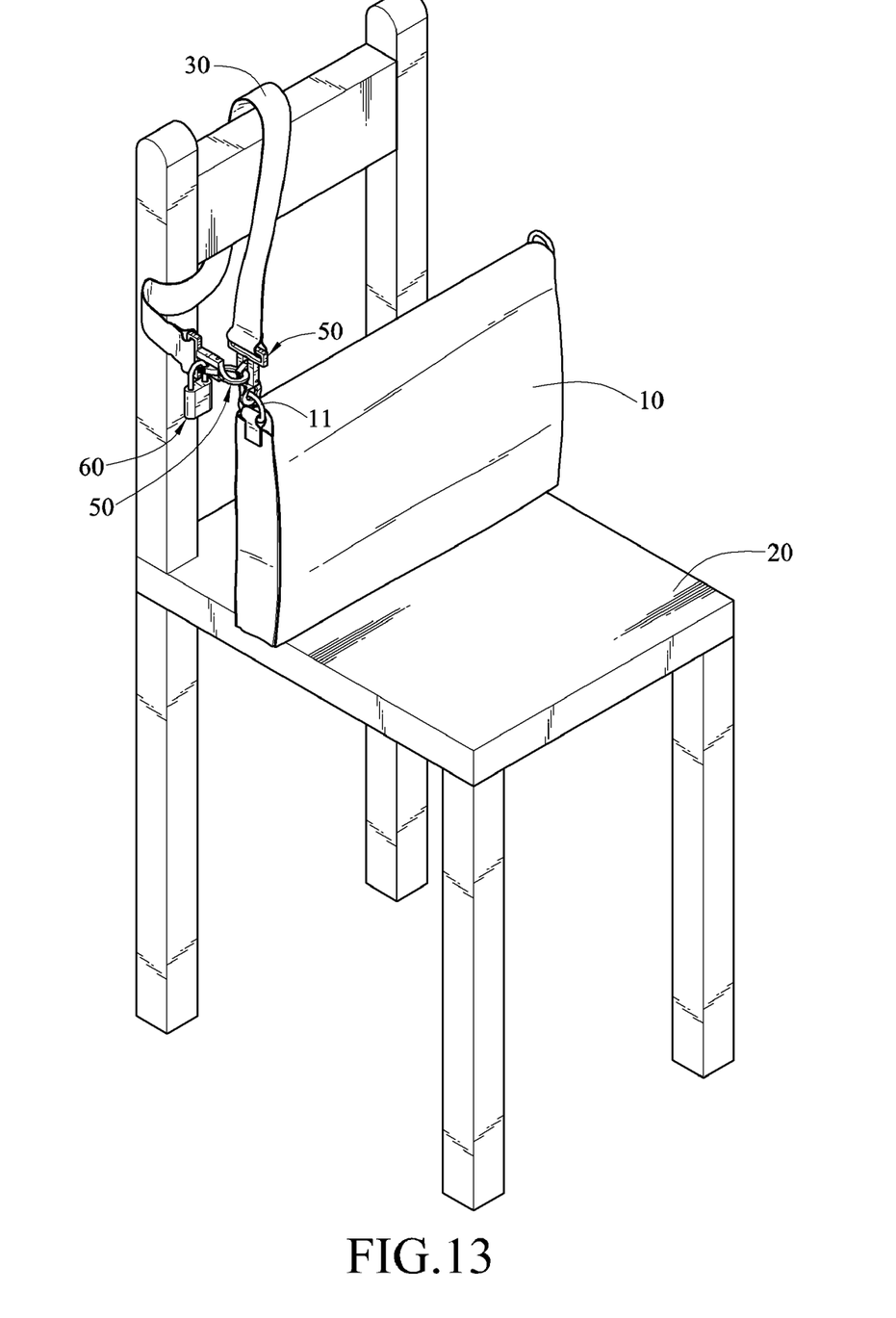
FIG. 13 is a schematic three-dimensional view of the shoulder strap assembly locking the first article with the second article according to the third embodiment of the present invention.
Figure 14:
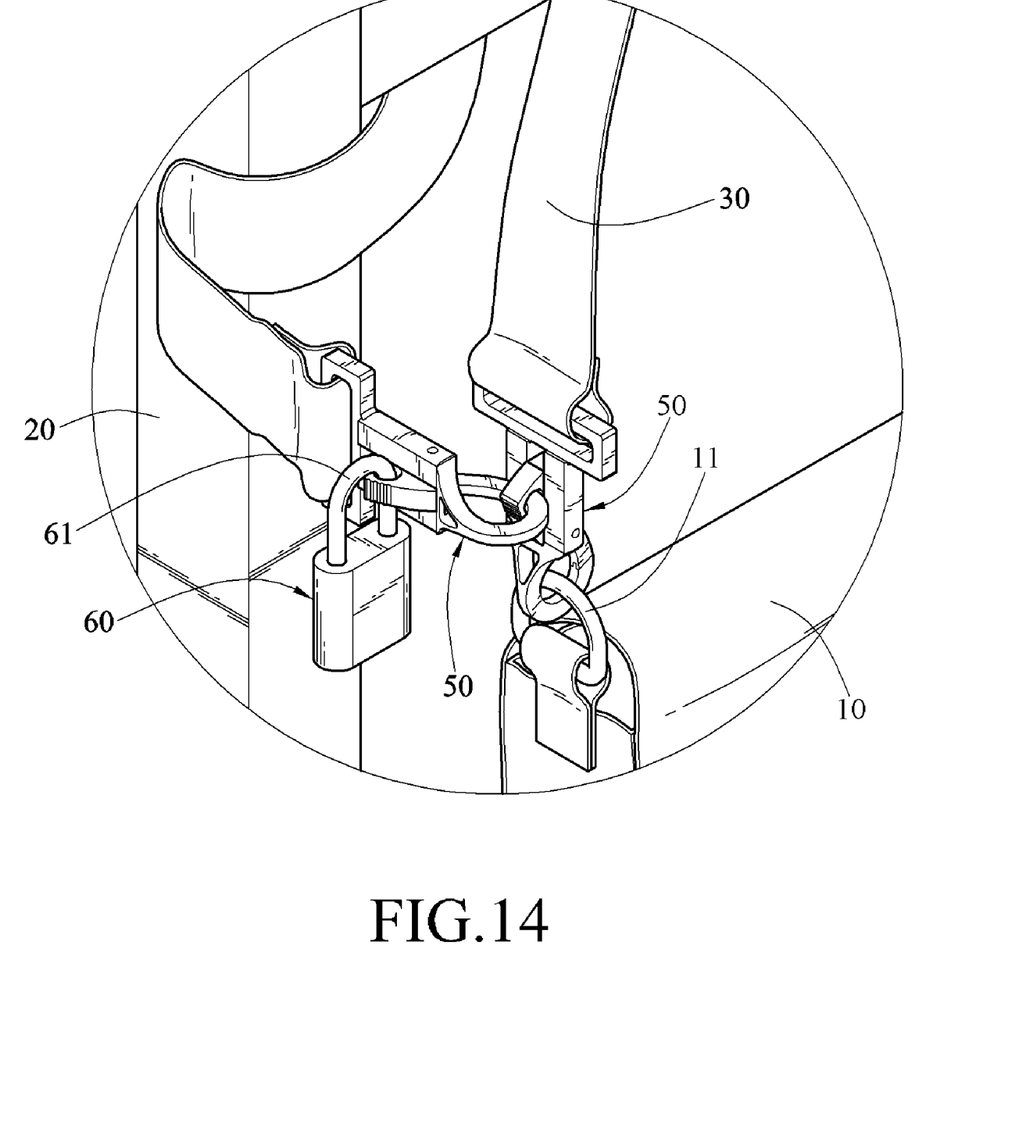
FIG. 14 is a partial schematic three-dimensional view of FIG. 13.

As shown in FIGS. 12, 13, and 14, the shoulder strap assembly having a snap hook structure and the snap hook structure thereof in the third embodiment of the present invention are shown. The detailed implementation method in the third embodiment of the present invention is substantially the same as that of the first embodiment, and differs mainly in terms that the two ends of the strap 30 in the third embodiment are combined with the first article 10 through the snap hook structure 50. In this manner, the user may detach one snap hook structure 50 from the first article 10, then wind the strap 30 around the second article 20, put the hook portion 512 of the detached snap hook structure 50 into the perforation (i.e., the stop portion 533) of the undetached snap hook structure 50, so as to prevent the undetached snap hook structure 50 from separating from the first article 10. Finally, the user puts the hook 61 of the lock 60 into the perforation (i.e., stop portion 533) of the detached snap hook structure 50, thereby locking the first article 10 with the second article 20.

In the present invention, the hook portion of the lock or the lock snap-hook structure is put into the stop portion of the snap hook structure, so as to prevent the snap hook structure from separating from the first article (e.g. a bag). Meanwhile, the strap winds around the second article (e.g. a desk) to lock the first article with the second article, thereby providing an effective anti-theft mechanism to protect the first article under no care from being stolen.

What is claimed is:

1. A snap hook structure, comprising:
a main body, having a body portion with two sides and a hook portion extending from the body portion, wherein the body portion has a slot penetrating the two sides, the hook portion forms a hooking range, and an end edge of the hook portion has an abutted surface which is inclined to the body portion; and
a keeper member, pivoted with its middle section in the slot via an axle, and having an acting portion corresponding to the body portion and a clamping portion enclosing the hooking range, the acting portion and the clamping portion located at two opposite ends of the keeper member respectively, the acting portion and the clamping portion located at two opposite sides of the body portion, and the keeper member rotating to drive the clamping portion to open the hooking range, wherein the acting portion has a stop portion, the axle is located between the stop portion and the clamping portion, a block member is put in the stop portion to limit the rotation of the keeper member and enable the clamping portion to keep enclosing the hooking range, an end edge of the clamping portion has an abut surface which urges the abutted surface and an end edge of the acting portion has a limiting flange facing the hook portion, and the limiting flange abuts against the hook portion, so as to prevent the clamping portion from exiting from the hooking range.

2. The snap hook structure according to claim 1, further comprising an elastic member disposed in the main body and corresponding to the keeper member, wherein the elastic member pushes the keeper member to make the clamping portion normally enclose the hooking range.

3. The snap hook structure according to claim 1, wherein the body portion has a limiting plane corresponding to the acting portion, the stop portion is a perforation, and the block member is put into the perforation and abuts against the limiting plane, so as to limit the rotation of the keeper member.

4. The snap hook structure according to claim 1, wherein the abutted surface has a rib, the abut surface has a rabbet, and the rib is embedded into the rabbet when the abut surface urges against the abutted surface.

5. The snap hook structure according to claim 1, wherein the body portion has a ring portion at the other end opposite to the hook portion, and the ring portion is fitted with a strap.

6. The snap hook structure according to claim 1, wherein an end edge of the acting portion has a plurality of parallel grooves, and the grooves are depressed inwards from the end edge of the acting portion.

7. A shoulder strap assembly which is configured to combine a strap with a first article, wherein the strap winds around a second article, the shoulder strap assembly comprising:
a snap hook structure, comprising:
a main body, having a body portion with two sides and a hook portion extending from the body portion, wherein the body portion has a slot penetrating the two sides, an end edge of the hook portion has an abutted surface which is inclined to the body portion, the hook portion forms a hooking range at one end of the body portion and hooks the first article, and the other end of the body portion is connected to the strap; and
a keeper member, pivoted with its middle section in the slot via an axle, and having an acting portion corresponding to the body portion and a clamping portion enclosing the hooking range, the acting portion and the clamping portion located at opposite two ends of the keeper member respectively, the acting portion and the clamping portion located at two opposite sides of the body portion as well, and the keeper member being rotated to drive the clamping portion to open the hooking range, wherein the acting portion has a perforation, the axle is located between the perforation and the clamping portion, an end edge of the clamping portion has an abut surface which urges the abutted surface, and an end edge of the action portion has a limiting flange facing the hook portion and the limiting flange abuts against the hook portion so as to prevent the clamping portion from exiting from the hooking range; and
a lock snap-hook structure, comprising:
a lock main body, having a lock body and a lock hook extending from the lock body, wherein the lock hook forms a lock hooking range at one end of the lock body, the other end of the lock body is connected with the other end of the strap, and the lock hook selectively hooks the first article, so as to connect the strap and the first article, or is put into the perforation to limit the rotation of the keeper member and enable the clamping portion to keep enclosing the hooking range;
a lock keeper member, rotatably disposed on the lock main body, and having a lock acting portion corresponding to the lock body and a lock clamping portion enclosing the lock hooking range, and the lock keeper member rotating to drive the lock clamping portion to open the lock hooking range; and a lock head, disposed on the lock body and having a retractable stopper, wherein the stopper protrudes from the lock head in a locking mode so as to block the lock keeper member to limit the rotation of the lock clamping portion and enable the lock clamping portion to keep enclosing the lock hooking range, so as to lock the first article with the second article.

8. The shoulder strap assembly according to claim 7, further comprising an elastic member disposed in the main body and corresponding to the keeper member, wherein the elastic member pushes against the keeper member to make the clamping portion normally enclose the hooking range.

9. The shoulder strap assembly according to claim 7, wherein the lock snap-hook structure further comprises an elastic member fitted on the stopper, the elastic member normally pushes against the stopper to abut against the lock keeper member, such that the lock clamping portion normally encloses the lock hooking range.

10. The shoulder strap assembly according to claim 7, wherein the body portion has a limiting plane corresponding to the acting portion, and the lock hook put into the perforation and abuts against the limiting plane, so as to limit the rotation of the keeper member.

11. The shoulder strap assembly according to claim 7, wherein the abutted surface has a rib, the abut surface has a rabbet, and the rib is embedded into the rabbet when the abut surface urges against the abutted surface.

12. The shoulder strap assembly according to claim 7, wherein an end edge of the lock hook has an abutted surface which is inclined on lock body, an end edge of the lock clamping portion has an abut surface which urges the abutted surface.

13. The shoulder strap assembly according to claim 12, wherein the abutted surface has a rib, the abut surface has a rabbet, and the rib is embedded into the rabbet when the abut surface urges against the abutted surface.

14. The shoulder strap assembly according to claim 7, wherein the body portion has a ring portion opposite to the other end of the hook portion, and the ring portion is fitted on the strap.

15. The shoulder strap assembly according to claim 7, wherein the lock body has a ring portion opposite to the other end of the lock hook, and the ring portion is fitted on the strap.

16. The shoulder strap assembly according to claim 7, wherein an end edge of the acting portion has a plurality of parallel grooves, and the grooves are depressed inwards from the end edge of the acting portion.

17. The shoulder strap assembly according to claim 7, wherein an end edge of the lock acting portion end edge has a plurality of parallel grooves, and the grooves are depressed inwards from the end edge of the lock acting portion.

* * * * *